United States Patent

[11] 3,627,385

[72] Inventor Stanley L. Stokes
Florissant, Mo.
[21] Appl. No. 8,480
[22] Filed Feb. 4, 1970
[45] Patented Dec. 14, 1971
[73] Assignee Wagner Electric Corporation
Newark, N.J.

[54] CONTROL VALVE
19 Claims, 3 Drawing Figs.

[52] U.S. Cl. .................................... 303/6 C,
137/87, 137/505, 188/349, 303/84 A
[51] Int. Cl. ..................................... B60t 8/26,
B60t 11/34
[50] Field of Search ......................... 137/87,
505, 505.18; 303/6 C, 22 B, 22 A, 84, 84 A;
60/54.5 E; 188/349

[56] References Cited
UNITED STATES PATENTS
3,375,852  4/1968  Milster ..................... 303/6 C X
3,441,318  4/1969  Bueler ...................... 303/84 A X
3,450,443  6/1969  Bueler ...................... 303/6 C Primary Examiner—Milton Buchler
Assistant Examiner—John J. McLaughlin
Attorney—Joseph E. Papin ABSTRACT: A control valve for use in a split braking system having an indicating member movable from a normal position to a translated position in the event of the failure of one of the separately supplied fluid pressures acting thereon. A proportioning member is biased toward the indicating member and movable in response to a predetermined value of the other supplied fluid pressure toward metering engagement with the indicating member in its normal position to thereafter effect a metered applied fluid pressure in a predetermined ratio with the other supplied fluid pressure. The proportioning member is provided with a pair of opposed areas respectively subjected to the other supplied and applied fluid pressures to effect the predetermined ratio, and a third area is also provided on said proportioning member for subjection to the other supplied fluid pressure and additive to one of the opposed areas to alter the predetermined value of the other supplied fluid pressure at which the proportioning member is actuated to effect metering engagement with the indicating member in its translated position.

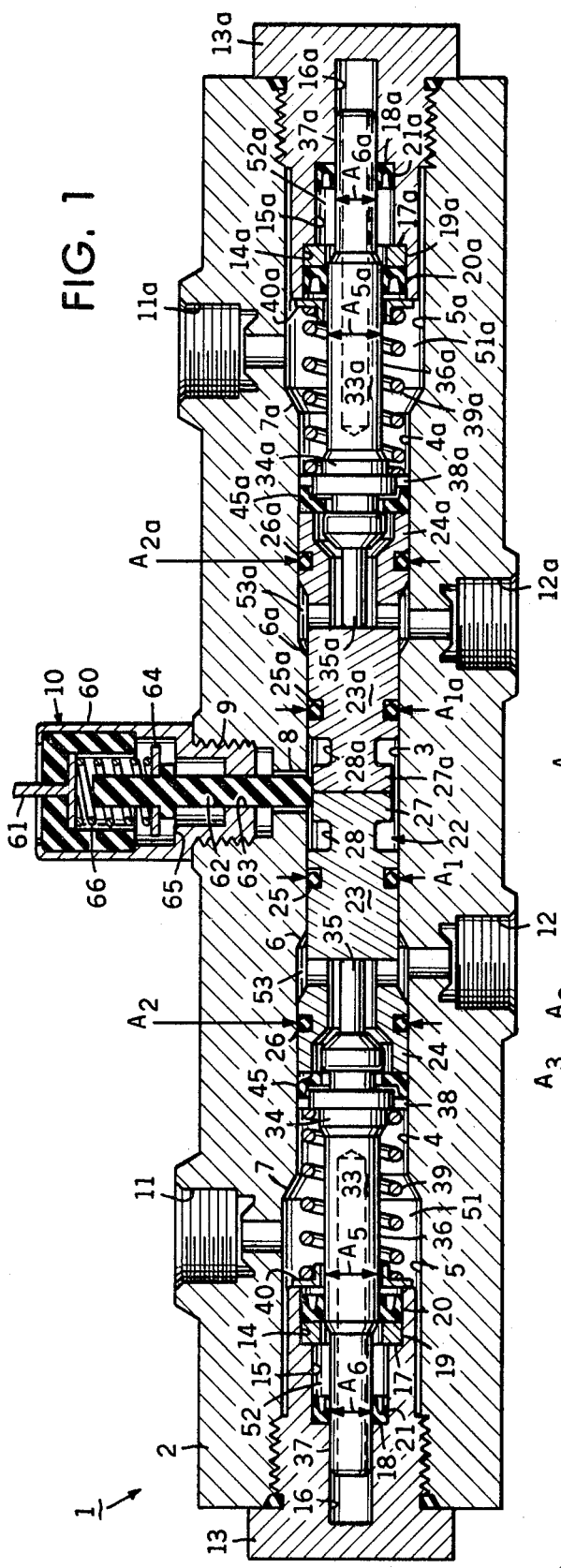
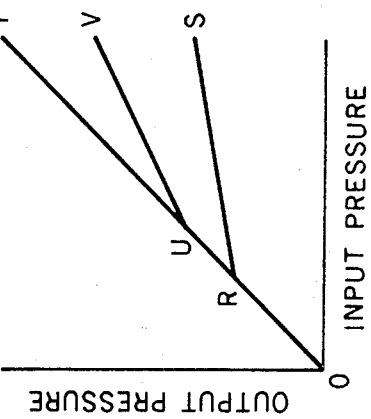
FIG. 1
FIG. 2
FIG. 3
INVENTOR
STANLEY L. STOKES
BY
Joseph E. Papin.

CONTROL VALVE

SUMMARY

The control valve in accordance with the present invention is especially designed for use in a horizontally split braking system. In such a brake system, it may be readily realized by those skilled in the art to which this invention relates that the magnitude of the fluid pressure at which metering or proportioning to the rear brakes is indicated should be appreciably greater in the event of the failure of one of the split systems. This is, of course, due to the fact that the entire deceleration of the vehicle is dependent on only one-half of the braking capability or potential of the vehicle when one of the horizontally split systems has failed.

The present control valve provides an indicating member which is movable from a normal position toward opposed translated positions in said control valve to indicate the failure of one of the separate fluid pressures of the split braking system supplied thereto, and a pair of proportioning members are provided for metering engagement with said indicating member to effect separate metered applied fluid pressures through said control valve in a predetermined ratio with the separate fluid pressures supplied thereto. The proportioning members are actuated in response to a predetermined value of the supplied and applied fluid pressures into metering engagement with the indicating member in its normal position, and said proportioning members include means for effecting actuation thereof into metering engagement with said indicating member in response to another predetermined value of the supplied and applied fluid pressures having a magnitude greater than the first-named predetermined value when said indicating member is in one of its translated positions.

RELATED PATENTS

This patent application is related to U.S. Pat. No. 3,441,318 issued to Richard C. Bueler on Apr. 29, 1969, and assigned to the common assignee of this patent application and is a patentably distinct improvement thereof.

DRAWING DESCRIPTION

FIG. 1 is a sectional view showing a control valve embodying the present invention in cross section, FIG. 2 is an enlarged fragmentary view showing the rightward proportioning piston of the control valve of FIG. 1 in cross section, and FIG. 3 is a graphical representation of the input and output fluid pressures of the control valve of FIG. 1.

Referring now to the drawings in detail and in particular to FIG. 1, a control valve 1 for use in a horizontally split braking system (not shown) is provided with a housing 2 having a bore 3 therein interposed between opposed stepped counterbores 4, 5 and 4a, 5a, and opposed shoulders 6, 6a and 7, 7a are respectively defined between said bore and said counterbores 4, 4a and between said counterbores 4, 4a and 5, 5a. A cross-bore 8 is also provided in the housing 2 having one end intersecting the bore 3 adjacent the midportion thereof while the other end thereof connects with a threaded cross-bore 9 which is provided to receive an electrical switch indicated generally at 10, to be discussed hereinafter. Inlet ports 11, 11a, which are respectively connected with the separate fluid pressure generating chambers of a split master cylinder (not shown), are provided in the housing 2 intersecting the counterbores 5, 5a, and outlet ports 12, 12a, which are connected to right and left rear brakes, are respectively provided in the housing 2 intersecting with the counterbores 5, 5a adjacent to the shoulders 6, 6a. Closure members or end plugs 13, 13a are threadedly received in the open ends of the housing counterbores 5, 5a, and stepped bores 14, 15, 16 and 14a, 15a, 16a are provided in said closure members, respectively. Annular shoulders or abutments 17, 18 and 17a, 18a are provided on the closure members 13, 13a between the stepped bores 14, 15 and 15, 16 and between the stepped bores 14a, 15a and 15a, 16a, respectively. Annular spacers or seal seating members 19, 19a are positioned in the stepped bores 14, 14a in engagement with the shoulders 17, 17a and provide a seat or abutment for annular sealing members 20, 20a which are sealably engaged with the stepped bores 14, 14a, and annular sealing members 21, 21a are seated on the shoulders 18, 18a in sealing engagement with the stepped bores 15, 15a.

An indicator or switch actuating member, indicated generally at 22, is provided with opposed abutting pistons 23, 23a slidable in the housing bore 3 and having opposed enlarged head portions 24, 24a slidable in the housing counterbores 4, 4a. Peripheral seals 25, 25a are carried in the pistons 23, 23a in sealing engagement with the housing bore 3, and peripheral seals 26, 26a are carried in the pistonhead portions 24, 24a in sealing engagement with the housing counterbores 4, 4a between the inlet and outlet ports 11, 11a and 12, 12a. Mating or substantially coaxial lands or positioning portions 27, 27a are provided on the pistons 23, 23a being normally positioned beneath the housing cross-bore 8, as shown, and peripheral locking grooves 28, 28a are provided in said pistons between said land portions and the seals 25, 25a. Referring now also to FIG. 2, stepped bores 29, 30 and 29a, 30a are provided in the pistonheads 24, 24a, and the larger of said stepped bores 29, 29a intersects with the opposed end portions 31, 31a of said pistonheads while the smaller of said stepped bores 30, 30a are intersected by a cross-passage 32, 32a provided in the pistons 23, 23a.

Metering or proportioning members, such as the pistons indicated generally at 33, 33a, are provided with head portions 34, 34a integrally formed with and interposed between stop members 35, 35a and reduced stepped extensions 36, 36a and 37, 37a. The heads 34, 34a are provided with a plurality of radially extending, hexagonally shaped guides 38, 38a, and proportioning or metering springs 39, 39a are precompressed between said heads and retainers 40, 40a to respectively urge said retainers and the piston stops 35, 35a into abutment with the interior ends of the closure members 13, 13a and the switch pistons 23, 23a. Annular peripheral grooves 41, 41a are provided in the proportioning piston heads 34, 34a having annular base walls 42, 42a interposed between radially extending sidewalls 43, 43a 44, 44a, said sidewalls 44, 44a defining valve members for engagement with annular proportioning piston heads 34, 34a having annular base walls 42, 42a interposed between radially extending sidewalls 43, 43a and 44, 44a, said sidewalls 44, 44a defining valve members for engagement with annular sealing or seating members 45, 45a. The sealing members 45, 45a are provided with annular base portions 46, 46a defining apertures therethrough and interposed between opposed sides 47, 47a 48, 48a. The seal sides 48, 48a are normally seated in abutting engagement with the opposed ends 31, 31a of the switch pistons 23, 23a and define valve seats for engagement with the valve members or groove sidewalls 44, 44a. The seals 45, 45a are also provided with annular peripheral lips 49, 49a in sealing engagement with the housing counterbores 4, 4a, and a plurality of return flow passages 50, 50a are provided between the seal sides 48, 48a and the lips 49, 49a, said return flow passages normally being closed by the sealing engagement of said lips with said housing counterbores, respectively.

Inlet chambers 51, 51a are defined in the housing counterbores 4, 5 and 4a, 5a between the closure members 13, 13a and the sealing members 45, 45a, and said inlet chambers are in open pressure fluid communication with the inlet ports 11, 11a at all times. Other or changeover chambers 52, 52a are defined in the closure member stepped bores 15, 15a between the seals 20, 21 and 20a, 21a, and said changeover chambers are adapted for selective subjecting to atmospheric fluid pressure and the fluid pressure at the inlet ports 11, 11a, as discussed hereinafter. Outlet chambers 53, 53a are defined in the housing bore 3 and counterbores 4, 4a substantially between the sealing members 45, 45a and the seals 25, 25a being connected in open pressure fluid communication with the outlet ports 12, 12a at all times. The switch pistons 23, 23a are provided with opposed cross-sectional areas $A_1$, $A_{1a}$ defined by the sealing engagement of the seals 25, 25a with the housing bore 3 and also opposed cross-sectional areas $A_2$, $A_{2a}$ defined by the sealing engagement of the seals 26, 26a with the housing counterbores 4, 4a. The annular seating engagement of the sealing members sides 48, 48a with the switch piston ends 31, 31a define opposed effective areas $A_3$, $A_{3a}$ which are subjected to the fluid pressures at the inlet ports ll, lla acting on the sealing members 45, 45a. The proportioning pistonheads 34, 34a are provided with cross-sectional areas $A_4$, $A_{4a}$ substantially defined by the sealing engagement of the valve members 44, 44a with the sealing members 45, 45a which are respectively subjected to the fluid pressures at the outlet ports 12, 12a. The sealing engagement of the closure member seals 20, 20a and 21, 21a with the proportioning piston stepped extensions 36, 36a 37, 37a define cross-sectional areas $A_5$, $A_{5a}$ and $A_6$, $A_{6a}$ on the proportioning pistons 33, 33a. The areas $A_5$, $A_{5a}$ and $A_6$, $A_{6a}$ are respectively subjected to the atmosphere and the fluid pressures in the changeover chambers 52, 52a, and the areas $A_{A5a}$ and $A_6$, $A_{6a}$ are additive to and opposed to the areas $A_4$, $A_{4a}$, respectively. It should be noted that the areas $A_5$, $A_{5a}$ are predeterminately greater than the areas $A_6$, $A_{6a}$, and the areas $A_4$, $A_{4a}$ are greater than the areas $A_5$, $A_{5a}$.

The electrical switch 10 includes a conductive closure or plug member 60 threadedly and conductively received in the open end of the housing cross-counterbore 9, and a metal terminal 61 extends through said plug member 60 and is insulated therefrom, said terminal having an exterior end for connection in an electrical circuit of a type well known to the art for selectively energizing a driver warning or dash lamp (not shown). A nonconductive switch follower member 62 is slidably received in a bore 63 provided in the plug member 60 and has a lower end portion extending through the housing cross-bore 8 into positioning engagement with the switch piston lands 27, 27a. To complete the description of the control valve 1, a conductive contact 64 is provided adjacent to the upper end of the follower member 62 for electrical engagement with another contact 65 on the plug member 60, and a current carrying spring 66 is interposed between the interior end of the terminal 61 and the follower member contact 64 urging the lower end of said follower member into following or positioning engagement with the switch piston lands 27, 27a and urging the follower contact 64 toward engagement with the plug member contact 65.

In the operation with the component parts of the control valve 1 positioned as shown in the drawings, separately supplied or input fluid pressures $P_1$, $P_2$ normally having substantially equal magnitudes are supplied upon actuation of a tandem or split system master cylinder (not shown) to the inlet ports 11, 11a, respectively, of said control valve. The input fluid pressures $P_1$, $P_2$ flow from the inlet ports ll, lla into the inlet chambers 51, 51a acting on the opposed areas $A_1$, $A_{1a}$ of the switch pistons 23, 23a to establish substantially equal and opposed forces $P_1 A_1$, $P_2 A_{1a}$, and the input fluid pressures $P_1$, $P_2$ flow from said inlet chambers through the sealing member apertures 46, 46a and the switch piston stepped bores 29, 30 and 29a, 30a and cross-passages 32, 32a into the outlet chambers 53, 53a to establish output or applied fluid pressures $P_{1o}$, $P_{2o}$ at the outlet ports 12, 12a having magnitudes substantially equal to those of the input fluid pressures $P_1$, $P_2$. Since the forces $P_1 A_1$, $P_2 A_{1a}$ are substantially equal and opposite, the switch pistons 23, 23a are normally maintained in their centered positions, as shown.

The output fluid pressures $P_{1o}$, $P_{2o}$ act on the effective areas $A_5$, $A_{5a}$ of the proportioning pistons 33, 33a to establish closing forces $P_{1o} A_5$, $P_{2o} A_{5a}$ urging said proportioning pistons against the compressive forces F, Fa of the metering springs 39, 39a; however, the metering spring forces F, Fa prevent movement of said proportioning pistons until the input fluid pressures $P_1$, $P_2$ and the output fluid pressures $P_{1o}$, $P_{2o}$ exceed a predetermined value, as shown by the point R on the line OT in the graphical representation of FIG. 3. When the predetermined value R of the input fluid pressures $P_1$, $P_2$ and output fluid pressures $P_{1o}$, $P_{2o}$ is attained, the closing forces $P_{1o} A_5$, $P_{2o} A_{5a}$ overcome the metering spring forces F, Fa to move the proportioning pistons 33, 33a from their original positions in directions outwardly of the switch pistons 23, 23a toward isolating positions. The movement of the proportioning pistons 33, 33a to their isolating positions engages the valve members 44, 44a with the sealing member valve seats 48, 48a closing the sealing member apertures 46, 46a to isolate the input fluid pressures $P_1$, $P_2$ in the inlet chambers 51, 51a from the output fluid pressures $P_{1o}$, $P_{2o}$ in the outlet chambers 53, 53a, and upon the engagement of said valve members with said valve seats, the input fluid pressures $P_1$, $P_2$ act on effective input areas $A_4 - A_5$, $A_{4a} - A_{5a}$ to establish input forces $P_1 (A_4 - A_5)$, $P_2 (A_{4a} - A_{5a})$ which are additive to the spring forces F, Fa to substantially balance the opposed output forces $P_{1o} A_4$, $P_{2o} A_{4a}$ established by the output fluid pressures $P_{1o}$, $P_{2o}$ acting on the effective output areas $A_4$, $A_{4a}$ of said proportioning pistons. With the proportioning pistons 33, 33a in their isolating positions, the opposing forces $P_1 A_1$, $P_2 A_{1a}$ acting on the switch pistons 23, 23a are eliminated and replaced by the substantially equal and opposing forces $P_1 A_3$, $P_2 A_{3a}$ which are established by the input fluid pressures $P_1$, $P_2$ acting on the areas $A_3$, $A_{3a}$ of the sealing members 45, 45a in seating engagement with the switch piston ends 31, 31a.

From the graphical representation in FIG. 3, it is obvious that increases in the magnitudes of the input fluid pressures $P_1$, $P_2$ in excess of the predetermined value R, as shown by the line ORT, will result in proportionally reduced increases in the output fluid pressures $P_{1o}$, $P_{2o}$, as shown by the line RS. For instance, when the input fluid pressures $P_1$, $P_2$ are increased to a value in excess of the predetermined value R, the input forces $P_1 (A_4 - A_5)$, $P_2 (A_{4a} - A_{5a})$ are correspondingly increased and additive to the metering spring forces F, Fa to overcome the output forces $P_{1o} A_4$, $P_{2o} A_{4a}$; therefore, the metering pistons 33, 33a are moved in an inward direction toward the switch pistons 23, 23a to metering positions disengaging the valve members 44, 44a thereof from the sealing member valve seats 48, 48a to effect metered applications of the increased input fluid pressures $P_1$, $P_2$ through the sealing member apertures 46, 46a and the outlet chambers 53, 53a to the outlet ports 12, 12a to effect proportional increases of the output fluid pressures $P_{1o}$, $P_{2o}$ in a predetermined ratio with the input fluid pressures $P_1$, $P_2$ at the inlet ports ll, lla, as shown by the line RS in the graph of FIG. 3 wherein $$P_{1o} = \frac{P_1(A_4 - A_5) + F}{A_4}, \text{ and}$$

$$P_{2o} = \frac{P_2(A_{4a} - A_{5a}) + Fa}{A_{4a}}.$$

Of course, the increased output fluid pressures $P_{1o}$, $P_{2o}$ effect a corresponding increase in the output forces $P_{1o} A_4$, $P_{2o} A_{4a}$, and when the increased output forces $P_{1o} A_4$, $P_{2o} A_{4a}$ attain an increased value substantially equal to that of the increased input forces $P_1 (A_4 - A_5)$, $P_2 (A_{4a} - A_{5a})$ and the additive metering spring forces F, Fthe proportioning pistons 33, 33a are again moved outwardly toward their isolating positions to reengage the valve members 44, 44a with the sealing member valve seats 48, 48a to again isolate the increased input fluid pressures $P_1$, $P_2$ and the increased output fluid pressures $P_{1o}$, $P_{2o}$. It is, of course, obvious that the proportioning pistons 33, 33a will be responsive to further increases in the input fluid pressures $P_1$, $P_2$ to effect further corresponding proportional increases in the output fluid pressures $P_{1o}$, $P_{2o}$ in the same manner as previously described, and since the input fluid pressures $P_1$, $P_2$ are substantially equal, the forces $P_1 A_3$, $P_2 A_{3a}$ acting across the switch pistons 23, 23a remain substantially equal obviating displacement of said switch pistons from their normally centered positions.

When the split system master cylinder is deactuated, the input fluid pressures, $P_1$, $P_2$ are vented to the atmosphere which eliminates the forces $P_1 A_3$, $P_1 A_{3a}$ acting on the switch pistons 23, 23a and sealing members 45, 45a and the input forces $P_1 (A_4 - A_5)$, $P_2 (A_{4a} - A_{5a})$ acting on the proportioning pistons 33, 33a. Upon the elimination of the input forces $P_1 (A_4 - A)$, $P_2 (A_{4a} - A_{5a})$, the output fluid pressures $P_{1o}$, $P_{2o}$ acting on the sealing members 45, 45a displace the lips 49, 49a thereof from sealing engagement with the housing counterbores 4, 4a, and in this manner, the output fluid pressures $P_{1o}$, $P_{2o}$ return from the outlet ports 12, 12a through the outlet chambers 53, 53a and past the displaced sealing member lips 49, 49a through the return flow passages 50, 50a into the inlet chambers 51, 51a to the inlet ports 11, 11a. When the outlet fluid pressures $P_{1o}$, $P_{2o}$ are so reduced to correspondingly reduce the output forces $P_{1o} A_4$, $P_{2o} A_{4a}$ to a value less than the metering spring forces $F$, $Fa$, the metering springs 39, 39a move the proportioning pistons 33, 33a inwardly toward their original positions reengaging the stops 35, 35a with the switch pistons 23, 23a and displacing the valve members 44, 44a from their seats 48, 48a on the sealing members 45, 45a to again open the sealing member apertures 46, 46a reestablishing open pressure fluid communication therethrough between the inlet and outlet ports 11, 11a and 12, 12a to effect complete elimination of the output fluid pressures $P_{1o}$, $P_{2o}$.

In the event of the failure of the input fluid pressure $P_2$ due to a malfunction of the split system master cylinder or other leaks or the like, it is, of course, desirable to maintain the metering or proportioning function of the proportioning piston 33 under such emergency conditions; however, it is also desirable to effect a change in the ratio between the input and output fluid pressures $P_1$, $P_{1o}$, as discussed hereinafter. When the magnitude of the input fluid pressure $P_1$ exceeds that of the failed input fluid pressure $P_2$ by a predetermined value, the force $P_1 A_1$ acting on the switch piston 23 concertedly displaces the switch pistons 23, 23a and the proportioning piston 33a against the force $Fa$ of the metering spring 39a rightwardly in the housing 2 toward a rightwardly displaced position engaging the rightward end of the proportioning piston 33a with the closure member 13, and, of course, the compressive force $Fa$ of the metering spring 39 concertedly urges the proportioning piston 33 toward the rightwardly displaced position in following engagement with the switch piston 23. The rightward movement of the proportioning piston 33 to its rightwardly displaced position disengages the stepped extension 36 from the closure member seal 20 and connects the changeover chamber 52 in open pressure fluid communication with the inlet port 11, and in this manner, the area $A_5-A_6$ on the proportioning piston 33 is subjected to the input fluid pressure $P_1$. When the input and output fluid pressures $P_1$, $P_{1o}$ attain a predetermined value U on the line OT in the graph of FIG. 3, the output fluid pressure $P_{1o}$ now acts on the effective area $A_6$ of the proportioning piston 33 to establish the closing force $P_{1o} A_6$ urging said proportioning piston leftwardly toward its isolating position to sealably engage the proportioning piston valve member 44 with the sealing member valve seat 48 closing the sealing member aperture 46 and isolating the input fluid pressure $P_1$ at the inlet port 11 from the outlet fluid pressure $P_{1o}$ at the outlet port 12. Of course, since the effective area $A_6$ is less than $A_5$, the predetermined value U or knee-point of the curve OUV in the graph of FIG. 3 is greater than the predetermined value R, and since the compressive force F of the metering spring 39 is decreased upon the movement of the proportioning piston 33 to its rightwardly displaced position, it is apparent that the slope of the line UV will be greater than that of the line ST in the graph of FIG. 3. With the proportioning piston 33 in its isolating position, the closing force $P_{1o} A_6$ is replaced by the input force of the input fluid pressure $P_1$ acting on the input effective area $A_4-A_6$ which is additive to the metering spring force F, and the input force $P_1 (A_4-A_6)$ and additive metering spring force F is substantially equal to and balanced by the output force of the input fluid pressure $P_{1o}$ acting on the output effective areas $A_4$.

From the graphical representation in FIG. 3, it is obvious that increases in the magnitude of the input fluid pressure $P_1$ in excess of the predetermined value U, as shown on the line UT, will result in proportionally reduced increases in the output fluid pressure $Po$, as shown by the line UV. When the input fluid pressure $P_1$ is increased to a value in excess of the predetermined value U, the input force $P_1 (A_4-A_6)$ is correspondingly increased and additive to the metering spring force F to overcome the output force $P_{1o} A_4$; therefore, the metering piston 33 is moved to its metering position disengaging the valve member 44 thereof from the sealing member valve seat 48 to effect the metered application of the input fluid pressure $P_1$ through the sealing member aperture 46 and the outlet chamber 53 to the outlet port 12 to effect the proportional increase in the output fluid pressure $P_{1o}$ in another predetermined ratio with the input fluid pressure $P_1$ at the inlet port 11, as shown by the line UV in the graph of FIG. 3 wherein $$P_{1o} = \frac{(A_4-A_6)+Fa}{A_4}.$$

Of course, the increased output fluid pressure $P_{1o}$ effects a corresponding increase in the output force $P_{1o} A_4$, and when the increased output force $P_{1o} A_4$ attains a value substantially equal to the additive input force $P_1 (A_4-A_6)$ and metering spring force F, the proportioning piston 33 is again moved to its isolating position. The proportioning piston 33 will be responsive to further increases in the input fluid pressure $P_1$ to effect further proportional increases in the output fluid pressure $P_{1o}$ in the same manner as previously described when the input fluid pressure $P_2$ is failed. Of course, when the split system master cylinder is deactuated to vent the input fluid pressure $P_1$ to atmosphere the input force $P_1 (A_4-A_6)$ is eliminated and the output fluid pressure $P_{1o}$ displaces the sealing member lip 49 from sealing engagement with the housing counterbore 4 to open the sealing member return flow passages 50 permitting the return flow therethrough of the output fluid pressure $P_{1o}$ to the inlet port 11, as previously mentioned. Upon the reduction of the output force $P_{1o} A_4$ to a value less than the metering spring force F, the metering spring 39 moves the proportioning piston 33 to its original position effecting open pressure fluid communication between the inlet and outlet ports 11, 12 through the sealing member aperture 46.

Of course, the concerted movement of the switch pistons 23, 23a to their rightward displaced positions displaces the positioning land 27 thereof from beneath the follower member 62 of the switch 10 permitting the switch spring 66 to urge said switch follower member downwardly into locking engagement with the locking groove 28 of the switch piston 23 thereby maintaining the switch pistons 23, 23a and the proportioning piston 33a in their rightward displaced or translated positions against the force $Fa$ of the metering spring 39a. The downward movement of the switch follower member 62 also moves the follower member contact 64 into circuit making engagement with the switch contact 65 to energize the driver warning or dash lamp (not shown).

When the fluid pressure intensity of the system has been reestablished, removal of the switch 10 from the housing 2 disengages the switch follower member 62 from locking engagement with the switch piston permitting the compressive force of the metering spring 39a to concertedly move the switch pistons 23, 23a and proportioning pistons 33, 33a from their rightwardly displaced positions toward their normal centered positions against the force of the metering spring 39. This movement of the proportioning piston 33 leftwardly to its normal position reengages the stepped extension 36 thereof with the closure member seal 20 thereby again interrupting pressure fluid communication between the changeover chamber 52 and the inlet port 11. Any fluid pressure which might be trapped in the chamber 52 upon the engagement of the proportioning piston extension 36 with the closure member seal 20 will bleed past said seal when the inlet fluid pressure $P_1$ is vented to the atmosphere, as previously mentioned.

In the event of the failure of the input fluid pressure $P_1$, the force $P_2 A_{1a}$ acting on the switch piston 23a concertedly moves the switch pistons 23, 23a and the proportioning piston 33 toward their leftward displaced or translated positions engaging the leftward end of said proportioning piston with the closure member 13 and the proportioning piston 33a follows in response to the metering spring force Fa. The movement of the proportioning piston 33a to its leftward displaced position permits actuation of the switch 10, as previously described, and disengages the stepped extension 36a from the closure member seal 20a to connect the changeover chamber 52a in open pressure fluid communication with the inlet chamber 51a thereby subjecting the effective area $A_{5a}-A_{6a}$ to the inlet fluid pressure $P_2$ at the inlet port 11a. In its leftward displaced position, the proportioning piston 33a is actuated in the same manner as that previously described for the proportioning piston 33 in its rightward displaced position; therefore, for the sake of brevity, the description of the operation of the piston 33a in its leftward translated position is omitted.

From the foregoing, it is now apparent that a novel control valve 1 is disclosed and that changes or modifications as to the precise configurations, shapes and details of the construction set forth in the disclosure by way of illustration may be made by those skilled in the art without departing from the spirit of the invention.

The embodiment of the invention in which an exclusive property or privilege is claimed are defined as follows:

1. A control valve comprising a housing, a pair of proportioning members concertedly movable in said housing between first and second general operating positions upon preselected conditions and relatively movable in each of the first and second general operating positions for controlling the application through said housing of fluid pressure supplied thereto, one of said proportioning members being initially movable in response to the supplied and applied fluid pressures of first and second predetermined values toward an isolating position engaged with the other of the proportioning members to isolate the supplied and applied fluid pressures and being thereafter further movable in response to increases in the supplied fluid pressure in excess of the first and second predetermined values toward a metering position disengaged from said other proportioning member to effect a metered increase in the applied fluid pressure proportional with the increased supplied fluid pressure when said proportioning members are in the first and second general operating positions, respectively, an area on said one proportioning member for respective isolation from fluid pressure in said housing and subjection only to the supplied fluid pressure when said proportioning members are in the first and second general operating positions, and seal means in said housing and normally engaged with a portion of said one proportioning member to isolate said area from fluid pressure in said housing when said proportioning members are in the first general operating position, said portion of said one proportioning member being disengaged from said seal means to subject said area to the supplied fluid pressure upon movement of said proportioning members to the second general operating position, the second predetermined value of the supplied fluid pressure for initially actuating said one proportioning member when said area is subjected to the supplied fluid pressure in the second general operating position of said proportioning members being predeterminately greater than the first predetermined value of the supplied fluid pressure for initially actuating said one proportioning member when said seal means is engaged with said portion of said one proportioning member to isolate said area from the fluid pressure in said housing in the first general operating position of said proportioning members.

2. A control valve according to claim 1, wherein said one proportioning member includes resiliently urged means, said resiliently urged means being movable against its inherent force in response to the supplied and applied fluid pressures of the first and second predetermined values into its isolating position and being thereafter further movable in response to the increases in the supplied fluid pressure in excess of the first and second predetermined values toward its metering position when said resiliently urged means and other proportioning member are in the first and second general positions, respectively, and said area and portion being on said resiliently urged means.

3. A control valve according to claim 2, wherein said resiliently urged means and other proportioning member define with said housing a pressure fluid flow passage therethrough, a valve seat on said other proportioning member about said flow passage, and valve means on said resiliently urged means for engagement with said valve seat, said valve means being moved into engagement with said valve seat to close said flow passage and isolate the supplied and applied fluid pressures upon movement of said resiliently urged means to its isolating position and said valve means being thereafter disengaged from said valve seat to open said flow passage and effect the metered increase in the applied fluid pressure upon the movement of said resiliently urged means to its metering position.

4. A control valve according to claim 1, comprising a pair of stepped extensions on said one proportioning member, said area being defined on said one proportioning member between said stepped extensions, seal means in said housing and sealably engaged with the smaller of said stepped extensions, other seal means in said housing spaced from said first-named seal means and sealably engaged with a portion of the larger of said stepped extensions when said proportioning members are in the first general operating position to isolate said area from the supplied fluid pressure, said portion of said larger stepped extension being disengaged from said other seal means to subject said area to the one supplied fluid pressure upon movement of said proportioning member to the second general operating position.

5. A control valve according to claim 4, wherein said one proportioning member includes piston means, said stepped extension means being on said piston means, said piston means and other proportioning member defining with said housing a pressure fluid flow passage therethrough for the supplied and applied fluid pressures, a valve seat in said other proportioning member about said flow passage, valve means on said piston means for engagement with said valve seat, and resilient means urging said piston means toward abutment with said other proportioning member and normally displacing said valve means from said valve seat, said piston means being movable against said resilient means toward its isolating position in response to the supplied and applied fluid pressures of the first and second predetermined values acting thereon to move said valve means into engagement with said valve seat closing said flow passage and being thereafter movable toward its metering position in response to the force of the resilient means and increases in the supplied fluid pressure in excess of the first and second predetermined values to disengage said valve means from said valve seat opening said flow passages and effecting the metered increase in the applied fluid pressure when said proportioning members are in the first and second general operating positions, respectively.

6. A control valve comprising a housing having inlet and outlet ports therein, a pair of proportioning members concertedly movable in said housing between first and second general operating positions upon preselected conditions and relatively movable in each of the first and second general operating positions for controlling pressure fluid communication between said inlet and outlet ports, one of said proportioning members being initially movable in response to fluid pressure at said inlet and outlet ports of first and second predetermined values into engagement with the other of said proportioning members interrupting pressure fluid communication between said inlet and outlet ports and being thereafter further movable in response to increases in the fluid pressure at said inlet port in excess of the first and second predetermined values to a position disengaged from said other proportioning member to establish metered pressure fluid communication between said inlet and outlet ports to effect a metered increase in the fluid pressure at said outlet port proportionally with the increased fluid pressure at said inlet port when said proportioning members are in their first and second general operating positions, respectively, and an area on said one Proportioning member for isolation from fluid pressure when said proportioning members are in one of their first and second general operating positions and for subjection only to the fluid pressure at said inlet port when said proportioning members are in the other of their first and second general operating positions, seal means engaged between said housing and said one proportioning member isolating said area from fluid pressure when said proportioning members are in one of their first and second general operating positions, said seal means being disengaged from one of said housing and one proportioning member upon the movement of said proportioning members to the other of their first and second general operating positions, one of the first and second predetermined values being predeterminately greater than the other thereof upon the subjection of said area to the fluid pressure at said inlet port when said proportioning members are in the other of their first and second general operating positions.

7. A control valve comprising a housing, a pair of proportioning members concertedly movable in said housing between first and second general operating positions upon preselected conditions and defining with said housing in each of said first and second general operating positions inlet and outlet chambers, one of said proportioning members being movable in response to the fluid pressures in said inlet and outlet chambers of a predetermined value toward an isolating position engaged with the other of said proportioning members to interrupt pressure fluid communication between said inlet and outlet chambers and being thereafter further movable in response to increases in the fluid pressure in said inlet chamber in excess of the predetermined value to a metering position disengaged from said other proportioning member to establish metered pressure fluid communication between said inlet and outlet chambers and effect a metered increase of the fluid pressure in said outlet chamber proportional to the increased fluid pressure in said inlet chamber when said proportioning members are in the first and second general operating position, respectively, said one proportioning member also defining with said housing another chamber isolated from fluid pressure in said inlet chamber when said proportioning members are in their first general operating positions and connected in pressure fluid communication with the fluid pressure in said inlet chamber upon movement of said proportioning members to their second general operating positions, and an area on said one proportioning member and subjected to the fluid pressure in said other chamber, the predetermined value of the fluid pressure in said other chamber acting on said area upon the connection of said inlet chamber and other chamber in pressure fluid communication when said proportioning members are in their second general operating positions being predeterminately greater than the predetermined value of the fluid pressure in said inlet chamber when said proportioning members are in their first general operating positions isolating said other chamber and area.

8. A control valve comprising a housing having a pressure fluid flow passage therethrough, proportioning valve means movable between two operating positions in said housing upon preselected conditions for performing proportioning operations on the fluid pressure in said flow passage in each of the two operating positions, said proportioning valve means being operable generally in response to fluid pressure in said flow passage in excess of a predetermined value to thereafter effect a proportional application of the fluid pressure through said flow passage, an area on said proportioning valve means isolated from the fluid pressure in said flow passage when said proportioning valve means is in one of its operating positions and subjected to the fluid pressure in said flow passage when said proportioning valve means is in the other of its operating positions, and the magnitude of the predetermined value at which the proportioning operation of said proportioning valve means occurs in its other operating position when said area is subjected to the fluid pressure in said flow passage being predeterminately greater than the magnitude of the predetermined value at which the proportioning operation of said proportioning valve means occurs in its one operating position when said area is isolated from the fluid pressure in said flow passage.

9. A control valve according to claim 8, comprising seal means sealably engaged between said housing and said proportioning valve means to isolate said area from fluid pressure in said flow passage when said proportioning valve means is in its one operating position, said seal means being disengaged from one of said housing and proportioning valve means to subject said area to fluid pressure in said flow passage upon the movement of said proportioning valve means to its other operating position.

10. A control valve according to claim 8, comprising a pair of spaced seal means sealably engaged between said housing and said proportioning valve means, a chamber in said housing defined between said seal means and isolated from said flow passage when said proportioning valve means is in its one operating position engaged with said seal means, said area being within said chamber when said proportioning valve means is in its one operating position, and one of said seal means being disengaged from one of said housing and proportioning valve means to connect said chamber in pressure fluid communication with said flow passage and subject said area to fluid pressure in said flow passage upon the movement of said proportioning valve means to its other operating position.

11. A control valve according to claim 8, a pair of stepped extension means on said proportioning valve means defining a shoulder therebetween, said area being on said shoulder, a pair of spaced seal means respectively engaged between said housing and said extension means when said proportioning valve means is in its one position to isolate said area from fluid pressure in said flow passage, one of said seal means being disengaged from one of said housing and one of said extension means upon the movement of said proportioning valve means to its other operating position to subject said area to fluid pressure in said flow passage.

12. A control valve according to claim 11, comprising a chamber in said housing between said spaced seal means and isolated from fluid pressure in said flow passage when said proportioning valve means is in its one position, said area being within said chamber when said proportioning valve means is in its one position and said chamber and area being subjected to fluid pressure in said flow passage upon the disengagement of said one seal from said one of said housing and one extension means in response to the movement of said proportioning valve means to its other operating position.

13. A control valve according to claim 8, wherein said proportioning valve means include resiliently urged means, said resiliently urged means being initially movable in each of its operating positions against its own force in response to the fluid pressure in said flow passage of the predetermined value acting thereon toward a closed position in said flow passage interrupting pressure fluid flow therethrough and being thereafter further movable in response to its own force assisted by increases in the fluid pressure in excess of the predetermined value acting on said resiliently urged means upstream thereof in said flow passage toward a metering position to perform its metering operation and establish a reduced fluid pressure downstream of said resiliently urged means in said flow passage, said resiliently urged means also being movable in response to its own force from its one operating position to its other operating position upon the occurrence of the preselected conditions, and said area being on said resiliently urged means.

14. A control valve according to claim 13, comprising seal means sealably engaged between said housing and said resiliently urged means to isolate said area from fluid pressure in said flow passage when said resiliently urged means is in its one operating position, said seal means being disengaged from one of said housing and resiliently urged means to subject said area to fluid pressure in said flow passage upon the movement of said resiliently urged means toward its other operating position.

15. A control valve according to claim 13, wherein said resiliently urged means includes a proportioning piston movable in said housing, and spring means engaged with said proportioning piston, said area being on said proportioning piston, said seal means being engaged with said proportioning piston in its one operating position, said proportioning piston being initially movable in each of its operating positions against the force of said spring means in response to the fluid pressure in said flow passage of the predetermined value acting on said proportioning piston toward the closed position in said flow passage interrupting pressure fluid flow therethrough and being thereafter further movable in response to the force of said spring means assisted by increases in the fluid pressure in excess of the predetermined value acting on said proportioning piston upstream thereof in said flow passage toward the metering position to perform its metering operation and establish a reduced fluid pressure downstream of said proportioning piston in said flow passage, and said proportioning piston also being movable in response to the force of said spring means from the one operating position to the other operating position upon the occurrence of the preselected conditions.

16. A control valve according to claim 15, comprising extension means on said proportioning piston and engaged with said seal means to isolate said area when said proportioning piston is in its one operating position, said seal means being disengaged from one of said housing and extension means to subject said area to the fluid pressure in said flow passage upstream of said proportioning piston upon the movement of said proportioning piston to its other operating position.

17. A control valve according to claim 15, comprising a pair of opposed areas on said proportioning piston subjected to the fluid pressure in said flow passage, said proportioning piston being initially movable in each of its operating positions against the force of said spring means in response to the fluid pressure in said flow passage of the predetermined value acting on said opposed areas toward the closed position in said flow passage interrupting pressure fluid flow therethrough and being thereafter further movable in response to the force of said spring means assisted by the fluid pressure in said flow passage upstream of said proportioning piston acting on one of said opposed areas to the metering position to perform its metering operation and establish the reduced fluid pressure downstream of said proportioning piston in said flow passage acting on the other of said opposed areas, said first named area being additive to said one opposed area and subjected to the fluid pressure in said flow passage upstream of said proportioning piston when said proportioning piston is in its other operating position.

18. A control valve according to claim 17, wherein said other opposed area is predeterminately greater than said one opposed area.

19. A control valve according to claim 17, wherein said other opposed area is predeterminately greater than the additive one opposed area and said first-named area.

* * * * *

UNITED STATES PATENT OFFICE

CERTIFICATE OF CORRECTION

Patent No. 3,627,385          Issued December 14, 1971

Stanley L. Stokes

It is certified that error appears in the above-identified patent and that said Letters Patent are hereby corrected as shown below:

Column 2, line 40, after "43a" insert -- and --; line 41, including "proportioning", cancel down to and including -- annular -- in line 45; line 66, "subjecting" should be -- subjection --. Column 3, line 15, after "36a" insert -- and --; line 19, "A, $A_5a$" should be -- $A_5$, $A_5a$ --. Column 4, line 55, "Fthe" should be -- Fa, the --; line 75, "($A_4$ - A )" should be -- ($A_4$ - $A_5$) --. Column 5, line 68, "areas" should be -- area --. Column 6, line 13, "($A_4$ - $A_6$)" should be -- $P_1$ ($A_4$ - $A_6$) --; line 27, after "atmosphere" insert a comma -- , --. Column 7, line 73, after "general" insert -- operating --. Column 8, line 73, "Proportioning" should be -- proportioning --. Column 10, line 23, after the comma (,) insert -- comprising --; line 72, "13" should be -- 14 --.

Signed and sealed this 22nd day of May 1973.

(SEAL)
Attest:

EDWARD M. FLETCHER, JR.          ROBERT GOTTSCHALK
Attesting Officer                   Commissioner of Patents